March 9, 1954     E. A. LARAMEE     2,671,313
JET ENGINE VACUUM EXPANSION NOZZLE
Filed March 7, 1952
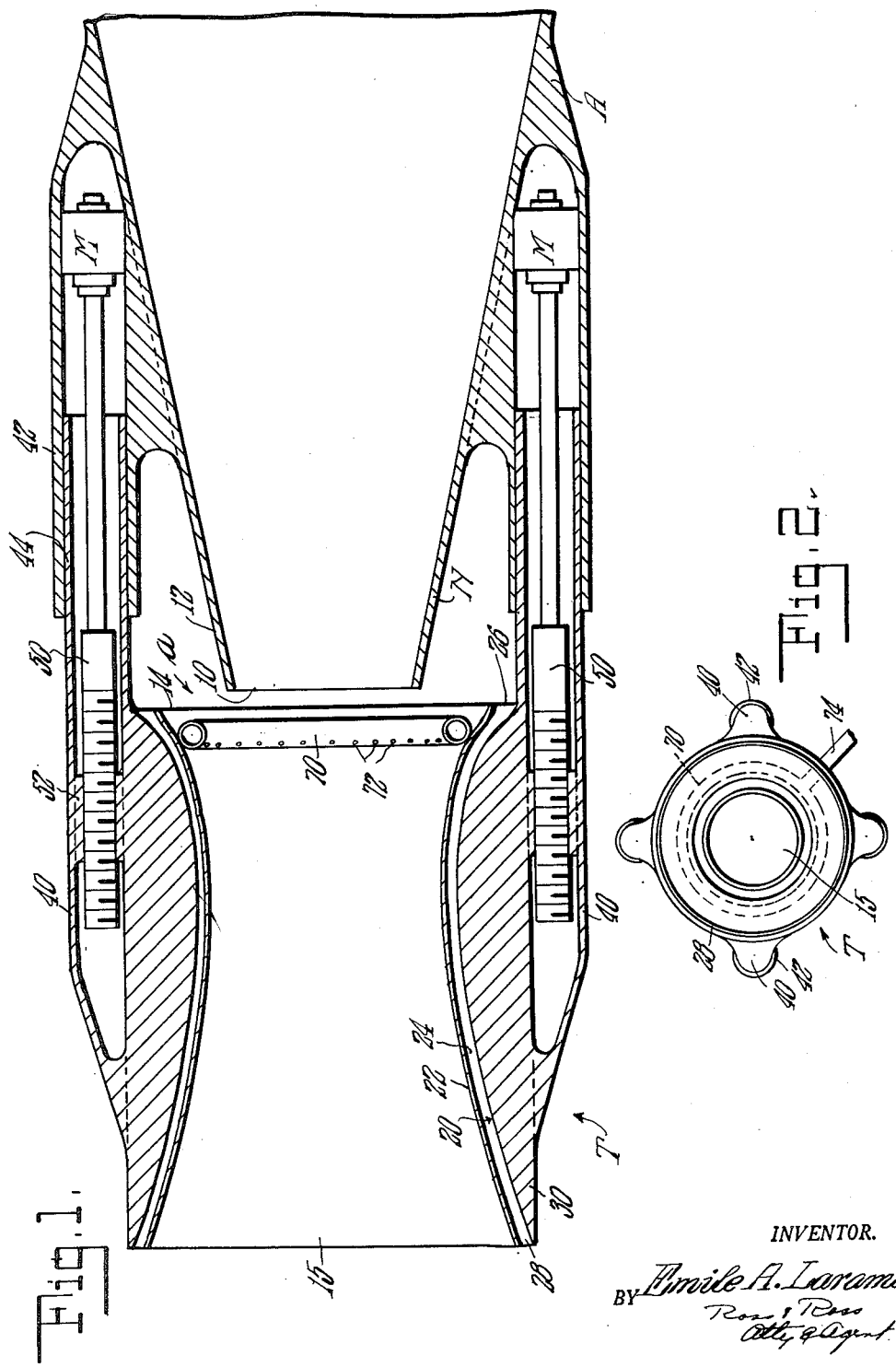
INVENTOR.
BY *Emile A. Laramee*

UNITED STATES PATENT OFFICE 2,671,313

JET ENGINE VACUUM EXPANSION NOZZLE

Emile A. Laramée, Chicopee, Mass.

Application March 7, 1952, Serial No. 275,269

2 Claims. (Cl. 60—35.6)

My invention relates to new and useful improvements in a vacuum expansion nozzle used on a motor which is usually adapted to be used in a moving vehicle moved by the reaction caused by the discharge of the motive fluid into the surrounding medium wherein the motive fluid is discharged at a high velocity through a nozzle directed in a direction opposite to that in which the motor moves.

My invention is directed more particularly to propulsion mechanism of the reaction type and comprises a new and novel method and means for obtaining greater expansion at the nozzle whereby the efficiency of the jet engine is greatly increased.

One of the primary purposes of my invention is to provide structural and operational improvements in devices of the class to which reference has been made, which improvements more fully utilize the boundary layer of air on the exposed surfaces of the aircraft or other vehicles with which the construction of my invention is employed in a new and unique manner so as to achieve the aforesaid increase in propulsive efficiency.

Constructions of the known prior art each employ mechanical devices by which the external air is introduced into the mixing chamber whereas by means of my invention, no such mechanical devices are employed. In this single important detail, as well as in other important details as will hereinafter appear, my invention distinguishes over the inventions which have preceded mine.

In accordance with the present invention, I induce a flow of outside or external air from the atmosphere and more particularly from the outer surface of the vehicle, the locomotion of which is ensured. I cause such air to circulate within a construction so as not only to contribute as a separate cooling agency for the hot gases of the motive fluid but also to serve as a separate mixing agency for the motive fluid whose gases are rearwardly ejected from the propulsion motor to the rear of the vehicle and through the construction wherein said cooling and mixing ensues and from which all gases are ultimately and finally expelled.

The external air thus entrained and introduced to the gases emanating from the propulsive unit of the vehicle mix therewith and impart thereto a velocity of increased ultimate ejection which is equal to or greater than the velocity of flight. In other words, I provide a concentric column of induced air which is sucked in from the atmosphere at the extreme outer rear end portion of the vehicle whose displacement is to be ensured, which air thoroughly mixes with the hot gaseous currents which are emitted from the nozzle at the said rear end portion. By means of the method of my invention, I create a vacuum of air and bring same within reach of the hot gases of the jet whereby the efficiency thereof is greatly increased.

It is a further object of my invention to provide a method and a means for directing the engine exhaust gas jet rearwardly through a construction whereby the jet is augmented by an induced flow of external air which is admitted thereto.

The feature of sucking external air, and particularly the air adjacent the outer surfaces of the vehicle being propelled and known as boundary air, by means of slots and orifices in the vehicle for the purpose of minimizing, if not eliminating, the effect of the boundary layer of air has long been known.

Likewise use has heretofore been made in vehicles of the propelling effect of air or other gases under pressure which are rearwardly ejected through one or more nozzles so as to provide a propulsive force.

My invention contemplates taking advantage of these known principles and improves thereon to the extent that by means thereof, the external air is entrapped and is admitted therethrough for purposes of mixing with the compressed air which is being rearwardly ejected. By such means, in addition to the main propulsive effort heretofore known, I in effect provide an auxiliary means wherein the exhaust gas energy from the power plant is augmented, all to the end that the propulsive effort is increased.

My invention consists in certain new and original features of construction and combination of parts hereinafter set forth and claimed in conjunction with the annexed drawings which illustrate a certain form of embodiment thereof, which form is deemed preferable and is a specific disclosure for the purpose of illustrating one embodiment of the invention by way of an example since the same has been found in practice to give satisfactory and reliable results.

It is to be understood that the various parts of which the invention consists can be variously changed within the scope of the appended claims without departing from the broad aspects and spirit of the invention and that the same is not to be limited to the precise arrangement and organization of the instrumentalities as herein shown and described.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawing wherein:

Fig. 1 is a sectional elevational view of the device of my invention; and

Fig. 2 is a rear end elevational view of the device shown in Fig. 1 on a reduced scale.

In the following description and claims, various details will be identified by specific names for convenience. These names, however, are intended to be as generic in their application as the art will permit.

Referring now to the drawing in detail, in which similar characters of reference indicate corresponding parts in the several figures, and referring more particularly to the preferred form of my invention selected for illustrative purposes, I have shown a portion of a body generally designated as A such as a wing or fuselage of an aircraft within which the power plant is enclosed and having at its rearmost end a conical terminal or extremity of a discharge of a nozzle N through which the gas upon leaving the turbine is discharged as a propulsion jet at the trailing edge of the wing or fuselage in the case of an aircraft. The residual energy in the motive fluid discharged from the turbine is available to propel the aircraft.

For purposes of simplification, the main air inlet, engine compressor and combustion chamber which form the heated gases, the turbine and the propulsive compressor are not shown in this disclosure, they not being essential parts of this specific invention.

A coaxial auxiliary nozzle is generally designated by T and is of Venturi form. The member T is in peripherally spaced relation relative to the rearmost extremity of the nozzle N. That is, it has its forward end spaced concentrically around the conical terminal portion 10 of the nozzle N.

The aperture or bore of the auxiliary nozzle T is in alignment with the open end 10 of the nozzle N and its forward end is spaced from the outer surface 12 of the nozzle N.

The mouth 14 of the auxiliary nozzle T is greater than the discharge end 10 of the nozzle bore so as to provide a narrow annular suction passage indicated by arrow $a$ leading into the auxiliary nozzle from and around the surface 12 of the rearward portion of the nozzle.

The main passage through the auxiliary nozzle is given a suitable shape such as will provide a flow of the exhaust gases of the jet and will assist in inducing a flow of the external, or entrained air through the suction passage and into the main passage of the auxiliary nozzle. The shape may be in the general form of a funnel or a conduit with a flared entrance portion having a mouth 14. That is, the interior wall of the auxiliary nozzle is curved in longitudinal section to provide a flow passage which converges and then diverges so as to provide a restricted throat in a manner such as is well known.

The inner wall 20 of the auxiliary nozzle supports a relatively thin secondary wall 22 which is spaced away therefrom throughout the length of the auxiliary nozzle so as to provide an air space 24 having an entrance opening 26 at the forward end of the auxiliary nozzle and an exit opening 28 at the rearward end thereof. The air space 24 is annular shaped and embraces the entire area of the interior of the auxiliary nozzle and receives therethrough cool external air which is entrained as the vehicle is in flight whereby a cooling medium for the hot gases of the motive fluid is provided.

The auxiliary nozzle has a smooth outer surface 30 of any desired streamlined shape so as to offer a minimum of resistance to the surrounding atmosphere.

The auxiliary nozzle T is engageable with the nozzle N by means of guides 40 which are secured to the auxiliary nozzle and guideways 42 which are secured to the nozzle N, each telescopically receiving a portion 44 of one of the related members 40. The guides 40 and guideways 42 are of tubular design of such configuration as to permit the aforesaid telescoping action.

As shown, there are four of such guides 40 and four of such guideways 42 which are spaced at 90° angles relative to each other around the outer surface 30 of the auxiliary nozzle and the outer surface 12 of the nozzle although it will be understood that any appropriate number of pairs of guides and guideways may be employed.

The pairs of guides and guideways are each adapted to enclose a screw 50 which may be driven at one end thereof by an electric motor M contained within the guideway 42 as shown. It will be understood that the control means may be effected by any desired means of electric, or pneumatic or hydraulic apparatus, the effort for operating such control being transmitted thereto from a control mechanism located in the driving compartment of the vehicle.

The opposite end of the screw 50 is threadedly engageable with a boss 52 fixed to the wall of the guide 40. Upon rotation of the screws, it will be appreciated that the auxiliary nozzle may be adjusted forwardly and rearwardly along the horizontal axis of the nozzle and relative to the nozzle terminal. Thus the auxiliary nozzle may be projected forwardly of the nozzle terminal to any reasonable degree so as to more or less enclose same.

The auxiliary nozzle entrains air from the atmosphere through the annular passage $a$ between it and the nozzle terminal, certain of which air is led through the cool air passageway 24 around the circumference of the interior and certain of which is led into the main Venturi formed passageway of the device which serves to provide a mixing chamber receiving both the entrained air and the jet issuing from the nozzle.

The interior wall of the auxiliary nozzle is curved in a convergent manner as aforesaid to give the proper direction to the entrained air and to provide an auxiliary jet discharge area adequate to handle the entrained air and the motive fluid.

Aside from the advantage of cooling the mixed gases by means of certain of the entrained air passing through the cooling passageway, the construction of my invention permits the mixing of certain of the entrained air with the motive fluid with the result that the mass action is increased and more effective thrust is obtained.

My construction very materially increases the thrust of the discharge jet as it discharges the same with the external air through the outlet passage 15 at the trailing edge of the auxiliary nozzle.

Additionally, a fuel intensifier ring 70 of annular configuration is disposed at or near the forward opening 14 of the auxiliary nozzle and adjacent the wall 22 thereof.

Apertures 72 therein permit the expelling of such additional fuel as delivered to the ring by means of a conduit 74 leading thereto from the source of the motive power.

By this means, additional fuel is added to the mixing chamber containing the entrained air and the hot gases from the nozzle and serves to intensify the mixing action whereby increased thrust or propulsion is obtained.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Dual nozzle construction of a reaction propelling vehicle comprising in combination, a primary nozzle and an auxiliary nozzle separate therefrom, said primary nozzle having an outer end and provided with an elongated primary passageway having outwardly extending relatively converging sides terminating in a restricted outlet at said outer end thereof, said nozzle provided on its outerside with elongated hollow guideways having longitudinal axis parallel to the longitudinal axis of the primary passageway and being circumferentially spaced about the outer side thereof, said auxiliary nozzle provided with an elongated auxiliary passageway therethrough having an inner inlet mouth and provided with guides reciprocable in said guideways, said guideways and guides relatively arranged to position the auxiliary nozzle with the mouth thereof forwardly of the outlet of the primary nozzle and with the longitudinal axis of said auxiliary passageway in alignment with that of the primary passageway and facilitate movement of the auxiliary nozzle towards and away from the outer end of the primary nozzle, the sides of the auxiliary passageway converging outwardly from the inner mouth thereof to a point intermediate opposite ends thereof and then diverging from said point to a relatively enlarged outlet at the outer end thereof, an elongated secondary tubular wall within and coextensive with the auxiliary passageway provided with outer and inner sides complemental to the sides of said passageway and having an inner mouth and outer outlet, the outer side of said wall being spaced radially inwardly of the sides of the auxiliary passageway forming therewith an elongated annular air passageway around said secondary wall having an annular inlet at its inner end and an outlet at its outer end, the inner mouths of the secondary wall and inlet of said air passageway being relatively greater in diameter than the outer end of the primary nozzle and outlet thereof providing an annular suction pasageway between said outer end and mouth, and means acting on said guides for moving said auxiliary nozzle towards and away from the outer end of said primary nozzle to vary the radial transverse width of said annular suction passageway.

2. Dual nozzle construction of a reaction propelling vehicle set forth in claim 1 wherein an annular hollow fuel ring is provided in the mouth of said secondary wall having circumferentially spaced ports directed towards the outlet of said wall.

EMILE A. LARAMÉE.

References Cited in the file of this patent

UNITED STATES PATENTS

| Number | Name | Date |
| --- | --- | --- |
| 2,408,099 | Sherman | Sept. 24, 1946 |
| 2,464,724 | Sédille | Mar. 15, 1949 |
| 2,487,588 | Price | Nov. 8, 1949 |
| 2,597,253 | Melchior | May 20, 1952 |
| 2,599,879 | Walker | June 10, 1952 |
| 2,603,060 | Brown | July 15, 1952 |
| 2,630,673 | Woll | Mar. 10, 1953 |

FOREIGN PATENTS

| Number | Country | Date |
| --- | --- | --- |
| 920,387 | France | Jan. 4, 1947 |
| 572,724 | Great Britain | Oct. 22, 1945 |